(12) United States Patent
Bernard et al.

(10) Patent No.: US 8,083,187 B2
(45) Date of Patent: *Dec. 27, 2011

(54) CABLE DUCT COUPLER

(75) Inventors: William A. Bernard, Darien, IL (US); Charles Vander Velde, Frankfort, IL (US); Dennis J. Waszak, Wheaton, IL (US)

(73) Assignee: Panduit Corp., Tinley Park, IL (US)

( * ) Notice: Subject to any disclaimer, the term of this patent is extended or adjusted under 35 U.S.C. 154(b) by 1019 days.

This patent is subject to a terminal disclaimer.

(21) Appl. No.: 11/222,688

(22) Filed: Sep. 9, 2005

(65) Prior Publication Data

US 2006/0006291 A1 Jan. 12, 2006

Related U.S. Application Data

(63) Continuation of application No. 10/646,115, filed on Aug. 22, 2003, now Pat. No. 7,226,022, which is a continuation of application No. 10/323,527, filed on Dec. 18, 2002, now Pat. No. 6,634,605, which is a continuation of application No. 10/039,325, filed on Oct. 27, 2001, now Pat. No. 6,523,791, which is a continuation-in-part of application No. 09/585,699, filed on Jun. 1, 2000, now Pat. No. 6,450,458.

(51) Int. Cl.
*F16L 3/22* (2006.01)

(52) U.S. Cl. ........... 248/68.1; 248/48.1; 403/387; 52/11

(58) Field of Classification Search ............... 248/68.1, 248/48.1, 49; 403/387, 300, 375, 341, 302, 403/309, 363, 402, 122; 52/11, 220.5
See application file for complete search history.

(56) References Cited

U.S. PATENT DOCUMENTS

| 834,828 A | 10/1906 | Lutz |
| 917,328 A | 4/1909 | Lutz |
| 1,087,791 A | 2/1914 | Leavitt |

(Continued)

FOREIGN PATENT DOCUMENTS

BE 425475 1/1938

(Continued)

OTHER PUBLICATIONS

Emerson, Aim Electronics, Category 5 & Fiber Optic Duct Raceway Fitting, 2 pages.

(Continued)

*Primary Examiner* — Kimberly Wood

(74) *Attorney, Agent, or Firm* — Robert A. McCann; Christopher S. Clancy

(57) ABSTRACT

A cable duct coupler for coupling a first cable duct section to a second cable duct section without the need for tools, the cable duct coupler comprising a channel portion, a first outer guide element and a second outer guide element, a barb mount extending from at least one of the channel portion and the outer guide elements, and a barb having a body and first and second arms extending from the body, the barb being mounted on the barb mount, wherein at least a portion of the first arm extends at an angle between the first portion of the channel portion and the barb body and at least a portion of the second arm extends at an angle between the second portion of the channel portion and the barb body.

36 Claims, 8 Drawing Sheets

U.S. PATENT DOCUMENTS

| | | | |
|---|---|---|---|
| D49,688 S | 9/1916 | Abbott |
| D49,694 S | 9/1916 | Abbott |
| D52,954 S | 2/1919 | Hubbard et al. |
| 1,590,569 A | 6/1926 | Fisk |
| 1,682,840 A | 9/1928 | Foarch, Jr. |
| 1,862,433 A | 6/1932 | Ross |
| 2,316,166 A | 4/1943 | Huguelet |
| 2,682,321 A | 6/1954 | Le Brock |
| 2,821,154 A | 1/1958 | Tennison, Jr. |
| 2,823,056 A | 2/1958 | Di Meo et al. |
| 2,829,190 A | 4/1958 | Comlossy, Jr. |
| 2,834,622 A | 5/1958 | Reeves |
| D184,913 S | 4/1959 | Cataldo |
| 3,023,032 A | 2/1962 | Johnston et al. |
| 3,042,351 A | 7/1962 | Du Bois |
| 3,272,537 A | 9/1966 | Stone et al. |
| 3,275,355 A | 9/1966 | Endler et al. |
| 3,351,699 A | 11/1967 | Merckle |
| 3,370,121 A | 2/1968 | Merckle |
| 3,401,721 A | 9/1968 | George |
| 3,425,456 A | 2/1969 | Schibig |
| 3,451,033 A | 6/1969 | Flachbarth |
| 3,457,598 A | 7/1969 | Mariani |
| 3,471,629 A | 10/1969 | O'Leary |
| 3,570,546 A | 3/1971 | Jackson |
| 3,600,010 A | 8/1971 | Downs, III et al. |
| 3,633,628 A | 1/1972 | Duquette et al. |
| 3,841,101 A | 10/1974 | Henfrey |
| 3,875,618 A | 4/1975 | Schuplin |
| 3,906,146 A | 9/1975 | Taylor |
| 3,931,946 A | 1/1976 | Soltysik |
| 3,938,767 A | 2/1976 | Norris |
| 4,099,749 A | 7/1978 | Van Vliet |
| 4,105,051 A | 8/1978 | Visentin |
| 4,163,572 A | 8/1979 | Benscoter |
| 4,202,090 A | 5/1980 | Cook |
| 4,270,020 A | 5/1981 | Kenworthy et al. |
| 4,305,236 A | 12/1981 | Williams |
| 4,306,109 A | 12/1981 | Nattel |
| 4,398,564 A | 8/1983 | Young et al. |
| 4,602,124 A | 7/1986 | Santucci |
| 4,627,469 A | 12/1986 | Buard |
| 4,931,597 A | 6/1990 | Kimbrough et al. |
| 4,954,015 A | 9/1990 | McGowan |
| 5,035,092 A | 7/1991 | Brant |
| 5,038,528 A | 8/1991 | Brant |
| D320,782 S | 10/1991 | Henneberger |
| D321,682 S | 11/1991 | Henneberger |
| 5,067,678 A | 11/1991 | Henneberger et al. |
| 5,100,221 A | 3/1992 | Carney et al. |
| D327,874 S | 7/1992 | Henneberger |
| 5,161,580 A | 11/1992 | Klug |
| D334,380 S | 3/1993 | Henneberger |
| 5,271,585 A | 12/1993 | Zetena, Jr. |
| 5,271,586 A | 12/1993 | Schmidt |
| D347,209 S | 5/1994 | Henneberger |
| 5,316,243 A | 5/1994 | Henneberger |
| 5,316,244 A | 5/1994 | Zetena, Jr. |
| 5,338,083 A | 8/1994 | Gute |
| 5,391,840 A | 2/1995 | Hughes et al. |
| 5,522,675 A | 6/1996 | Gunter |
| 5,735,637 A | 4/1998 | Gunter |
| 5,752,781 A | 5/1998 | Haataja et al. |
| 5,872,336 A | 2/1999 | Long |
| 6,192,181 B1 | 2/2001 | Haataja et al. |
| 6,450,458 B1 | 9/2002 | Bernard |
| 6,512,875 B1 | 1/2003 | Johnson et al. |
| 6,523,791 B2 | 2/2003 | Bernard et al. |
| 6,634,605 B2 | 10/2003 | Bernard et al. |
| 6,739,795 B1 | 5/2004 | Haataja et al. |
| 2004/0051007 A1* | 3/2004 | Bernard et al. ............ 248/68.1 |
| 2005/0098687 A1* | 5/2005 | Waszak et al. ............ 248/49 |

FOREIGN PATENT DOCUMENTS

| | | |
|---|---|---|
| DE | 526367 | 6/1931 |
| DE | 2706191 A | 8/1978 |
| DE | 2488064 | 2/1982 |
| DE | 3114225 A1 | 11/1982 |
| DE | 3346211 A1 | 6/1985 |
| DE | 3636412 A1 | 4/1988 |
| DE | 3804542 A1 | 9/1989 |
| DE | 4120937 A1 | 3/1992 |
| DE | 3879353 | 4/1993 |
| DE | 20022356 U1 | 12/2001 |
| EP | 0315023 A2 | 5/1989 |
| EP | 0348285 A1 | 12/1989 |
| EP | 0798581 A1 | 1/1997 |
| EP | 1049226 A2 | 11/2000 |
| EP | 1160950 A2 * | 12/2001 |
| FR | 1100982 | 9/1955 |
| FR | 1138599 | 6/1957 |
| FR | 1207610 | 6/1958 |
| FR | 2343393 | 9/1977 |
| FR | 2365902 | 4/1978 |
| FR | 2488742 | 2/1982 |
| FR | 2680206 A1 | 2/1993 |
| FR | 2686141 A1 | 7/1993 |
| GB | 518208 | 2/1940 |
| GB | 549840 | 12/1942 |
| GB | 612162 | 11/1948 |
| GB | 956898 | 4/1964 |
| GB | 1124370 | 8/1968 |
| GB | 1342085 | 12/1973 |
| JP | 5130726 | 5/1993 |
| NL | 288545 | 3/1964 |
| SU | 920930 | 4/1982 |
| WO | 0075550 A1 | 12/2000 |

OTHER PUBLICATIONS

Networking and Protecting, PRŌ-DUCT Wiring Duct. http://www.hellermann.tyton.com, pp. 66-77.

SnapMark™ SMS2100 Series, Steel Raceways, Fittings, Connectors & Boxes . . . , 5 pages.

Standard Search Report from European Patent Office, File No. RS 107377 US, completed Sep. 14. 2001, 4 pages.

Standard Search Report from European Patent Office, File No. RS 107376 US, completed Sep. 11, 2001, 4 pages.

Tyco Electronics, LIGHTRAX, DITEL, Fiber Optic Raceway Systems, 2 pages.

Tyco Electronics, RAYDUCT, Raychem, FIST Fiber Ducting Systems, 2 pages.

Wiremold® Walker® Infloor Systems, Flushduct® and Components, Flushduct Racway, Fittings and Activations, ED763R1 updated Dec. 2000, 6 pages, www.wiremold.com.

Wiremold® Walker® Infloor Systems, Steel Wallduct, Vertical and Horizontal Wiring Feed Solutions, ED737R1 updated Jan. 2001. 8 pages, www.wiremold.com.

Wiremold® Wire Management Systems, CXN Profile™ Series Raceway, Highly Aesthetic Surface Nonmetallic Raceway System, ED940R2 updated Jan. 2001, 6 pages, www.wiremold.com.

AIM Electronics product information, Category 5 & Fiber Optic Duct Raceway Fittings.

* cited by examiner

CABLE DUCT COUPLER

RELATED APPLICATION

This application is a continuation, claiming priority to previously filed U.S. patent application Ser. No. 10/646,115, filed on Aug. 22, 2003 now U.S. Pat. No. 7,226,022, which is a continuation, claiming priority to U.S. patent application Ser. No. 10/323,527, filed on Dec. 18, 2002, now U.S. Pat. No. 6,634,605, which is a continuation, claiming priority to previously filed U.S. patent application Ser. No. 10/039,325, filed on Oct. 27, 2001, now U.S. Pat. No. 6,523,791, which is a continuation-in-part application, claiming priority to previously filed U.S. patent application Ser. No. 09/585,699, filed on Jun. 1, 2000, now U.S. Pat. No. 6,450,458, the entirety of the previously filed applications being incorporated herein by reference.

BACKGROUND OF THE INVENTION

Field of the Invention

Raceway duct systems have become very popular in recent years to route, protect, and conceal data, voice, video, fiber optic and/or power cabling. Such systems allow custom installation and can be provided within walls or more preferably provided on external surfaces, allowing ready access for reconfiguration, repair, or installation of additional equipment. Such systems may typically include various sections of duct or raceway, including straight sections and various fittings, such as 90N elbow fittings, 45N elbow fittings, T-fittings, four-way intersection (x) fittings, and the like, respective ones of which are affixed together by duct couplers to cumulatively form a duct system.

Due to the increase in number and sophistication of such raceway duct systems, the number of duct couplers being installed in such systems has also increased significantly. Therefore, it is important to have couplers that are easy to install and expensive to manufacture, and that provide relatively high pull-out force to prevent unintended disassembly.

SUMMARY OF THE INVENTION

In one form of the invention, there is provided a cable duct coupler for coupling a first cable duct section to a second cable duct section without the need for tools, the first and second cable duct sections each having an end, the cable duct coupler comprising a channel portion having a first portion generally complementary to the end of the first cable duct section and a second portion generally complementary to the end of the second cable duct section, a first outer guide element generally complementary to the end of the first cable duct section and a second outer guide element generally complementary to the end of the second cable duct section, wherein the end of the first cable duct section is receivable into the coupler between the first portion of the channel portion and the first outer guide element and the end of the second cable duct section is receivable into the coupler between the second portion of the channel portion and the second outer guide element, a barb mount extending from at least one of the channel portion and the outer guide elements, and a barb having a body and first and second arms extending from the body, the barb being mounted on the barb mount, wherein at least a portion of the first arm extends at an angle between the first portion of the channel portion and the barb body and at least a portion of the second arm extends at an angle between the second portion of the channel portion and the barb body, wherein upon insertion of the end of the first cable duct section into the coupler between the first portion of the channel portion and the first outer guide element, the first arm of the barb engages the first cable duct section to significantly resist withdrawal of the first cable duct section, and wherein upon insertion of the end of the second cable duct section into the coupler between the second portion of the channel portion and the second outer guide element, the second arm of the barb engages the second cable duct section to significantly resist withdrawal of the second cable duct section.

In another form of the invention, there is provided a cable duct system comprising a first cable duct section having an end, a second cable duct section having an end, and a cable duct coupler including, a channel portion having a first portion generally complementary to the end of the first cable duct section and a second portion generally complementary to the end of the second cable duct section, a first outer guide element generally complementary to the end of the first cable duct section and a second outer guide element generally complementary to the end of the second cable duct section, wherein the end of the first cable duct section is receivable into the coupler between the first portion of the channel portion and the first outer guide element and the end of the second cable duct section is receivable into the coupler between the second portion of the channel portion and the second outer guide element, a barb mount extending from at least one of the channel portion and the outer guide elements, and a barb having a body and first and second arms extending from the body, the barb being mounted on the barb mount, wherein at least a portion of the first arm extends at an angle between the first portion of the channel portion and the barb body and at least a portion of the second arm extends at an angle between the second portion of the channel portion and the barb body, wherein upon insertion of the end of the first cable duct section into the coupler between the first portion of the channel portion and the first outer guide element, the first arm of the barb engages the first cable duct section to significantly resist withdrawal of the first cable duct section, and wherein upon insertion of the end of the second cable duct section into the coupler between the second portion of the channel portion and the second outer guide element, the second arm of the barb engages the second cable duct section to significantly resist withdrawal of the second cable duct section.

In yet another embodiment of the invention, there is provided a method for assembling a cable duct system, the method comprising providing a first cable duct section having an end, providing a second cable duct section having an end, providing a cable duct coupler having a channel portion with a first portion generally complementary to the end of the first cable duct section and a second portion generally complementary to the end of the second cable duct section, a first outer guide element generally complementary to the end of the first cable duct section and a second outer guide element generally complementary to the end of the second cable duct section, a barb mount extending from at least one of the channel portion and the outer guide elements, and a barb having a body and first and second arms extending from the body, the barb being mounted on the barb mount, wherein at least a portion of the first arm extends at an angle between the first portion of the channel portion and the barb body and at least a portion of the second arm extends at an angle between the second portion of the channel portion and the barb body, inserting the end of the first cable duct section between the first portion of the channel portion and the first outer guide element until the first arm of the barb engages the first cable duct section to significantly resist withdrawal of the first cable duct section, and inserting the end of the second cable duct section between the second portion of the channel portion and the second outer guide element until the second arm of the barb engages the second cable duct section to significantly resist withdrawal of the second cable duct section.

DETAILED DESCRIPTION OF PREFERRED EMBODIMENTS

Figure 1:
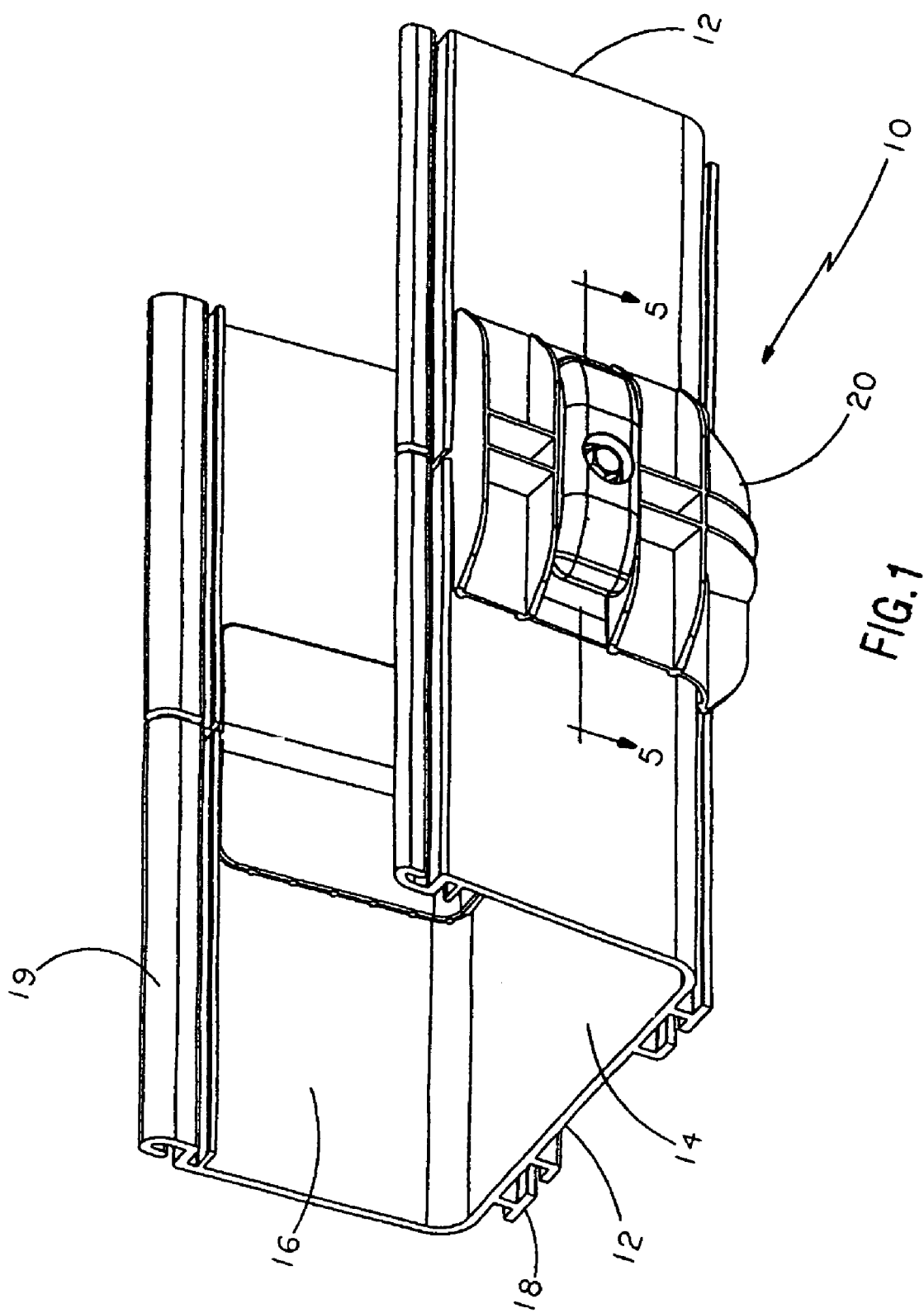
FIG. 1 is a perspective view of a cable duct coupler and cable duct system in accordance with an embodiment of the invention wherein first and second cable duct sections are coupled together by the coupler.

FIG. 1 shows a cable duct system 10 in accordance with an embodiment of the invention, and in particular shows a pair of discrete cable duct sections 12 each having an end 13 (FIG. 4) inserted into and retained by a cable duct coupler 20 in accordance with an embodiment of the invention. As seen, the end of the cable duct section preferably has a U-shape, with a bottom portion 14 and two upwardly extending side portions 16. The bottom portion may preferably include axially extending ribs 18 for strengthening the cable duct section, for facilitating the mounting of the cable duct section onto a floor, wall, bracket, or other supportive structure, and for preferably providing alignment criteria relative to the coupler 20. At or near the distal ends of the side portions 16, there may also preferably be a curved lip 19 or the like for facilitating the attachment of a lid over the cable duct section 12 to substantially enclose the cable duct section and retain one or more cables therein, as is well known in the art. The duct section may also include longitudinal ribs 17 on the outside thereof. The cable duct section is preferably made from a hard plastic or other strong, slightly deformable, dielectric material.

Figure 2:
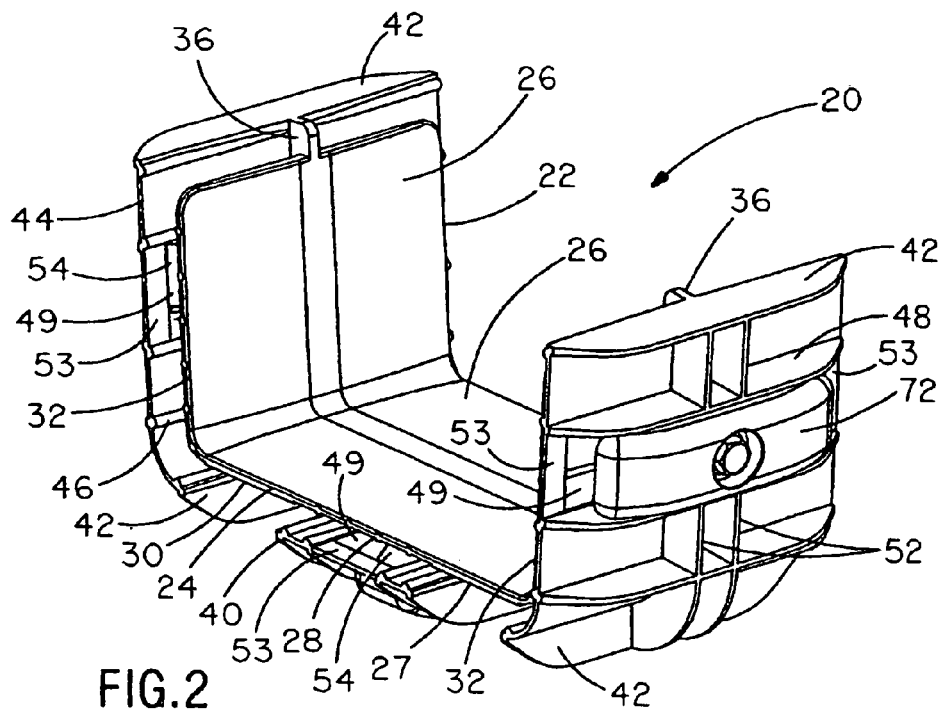
FIG. 2 is a perspective view of the coupler of FIG. 1.
Figure 3:
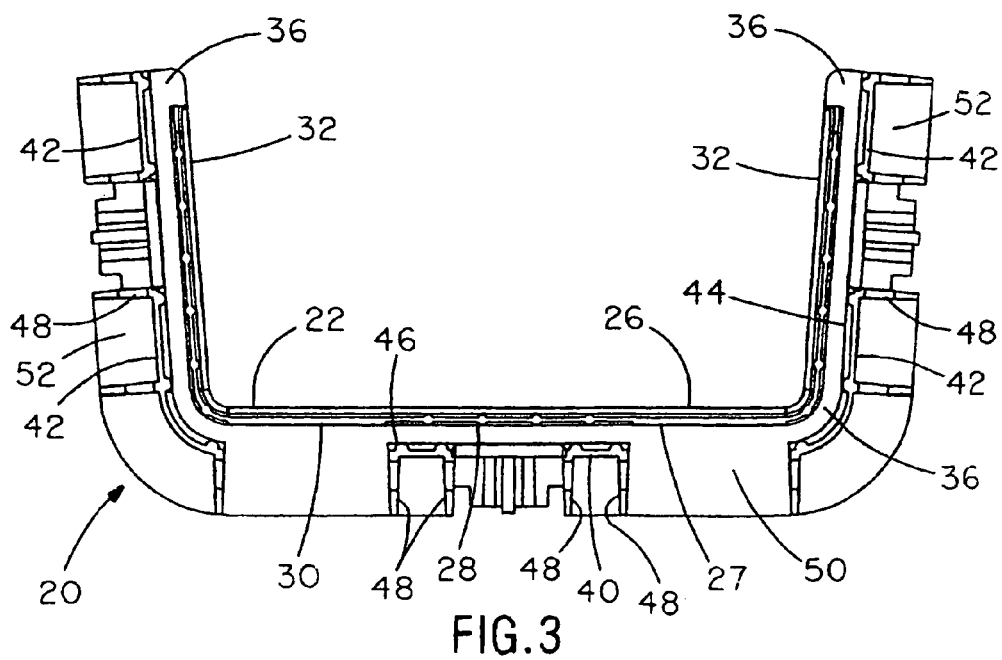
FIG. 3 is a front elevational view of the coupler of FIG. 1.

The coupler 20 is shown in greater detail in FIGS. 2 and 3, with FIG. 2 showing the coupler in perspective and FIG. 3 showing a front elevational view thereof. The coupler 20, as seen previously in FIG. 1, joins two discrete cable duct sections 12, and the coupler has an axial direction generally in accordance with and parallel to the direction in which cables will generally lie as they pass through the coupler, i.e., generally in line with the longitudinal direction of the cable duct sections.

Coupler 20 has a channel portion 22 which defines the cable pathway therethrough as the cable makes its way from one cable duct section to another. In a preferred embodiment, the channel portion includes a bottom portion 30 and two side portions 32 extending somewhat perpendicularly to each end of the bottom portion 30. The side portions 32, in a preferred embodiment, form a slightly obtuse angle (>90N) relative to the bottom portion 30, to open the section and facilitate cable retention and withdrawal. The channel portion 22 has an inner surface 26 including the facing surfaces of the side portions 32 and the upper surface of the bottom portion 30, and an outer surface 27 including the opposite surfaces of the bottom and side portions 30 and 32.

In a preferred embodiment, the coupler includes a rib 36 extending outwardly and generally perpendicularly from the outer surface 27 of the channel portion 22. The rib 36 preferably completely traverses the outer surface 27 of the channel portion 22, dividing it and the entire coupler into two symmetric halves, a first portion 24 for receiving a first cable duct section and a second portion 25 for receiving a second cable duct section. In a preferred embodiment, the rib 36 is centrally disposed along a line of symmetry for the coupler. As seen in FIGS. 2 and 3, the outer surface 27 of the channel portion 22 may preferably include contact ridges 28 for contacting and facilitating the alignment of an end of a cable duct section when inserted into the coupler.

Coupler 20 also includes a number of outer guide elements facilitating the alignment of a duct section end as it is inserted into the coupler. In the illustrated embodiment, the coupler includes a pair of outer guide elements 40 disposed opposite the outer surface 27 of the bottom portion 30 of the channel portion 22, and a pair of outer guide elements 42 opposing the outer surface 27 of each side portion 32 of the channel portion 22. The outer guide elements 40 include guide surfaces 44 and axial web portions 48, with the guide surfaces 44 and axial web portions 48 being supported by a centered transverse web portion 50, all of which extend from the narrow central rib 36 traversing the outer surface 27 of the channel portion 22. The outer guide elements 42 opposite the side portions 32 of the channel portion also include guide surfaces 44 and axial web portions 48, but they are supported by a pair of non-centrally disposed transverse web portions 52 extending outwardly from the corresponding guide surfaces 44. Any or all of the guide surfaces 44 of the respective outer guide elements 40 and 42 may preferably include alignment ridges 46 for contacting and facilitating the alignment of an end of a cable duct section being inserted into the coupler. Additionally, there may be any number of guide elements 40 and 42 within the scope of the invention, and the gaps 49 between adjacent guide elements may, in particular embodiments of the invention, be spanned by a strengthening web 53 to strengthen the coupler generally.

Figure 4:
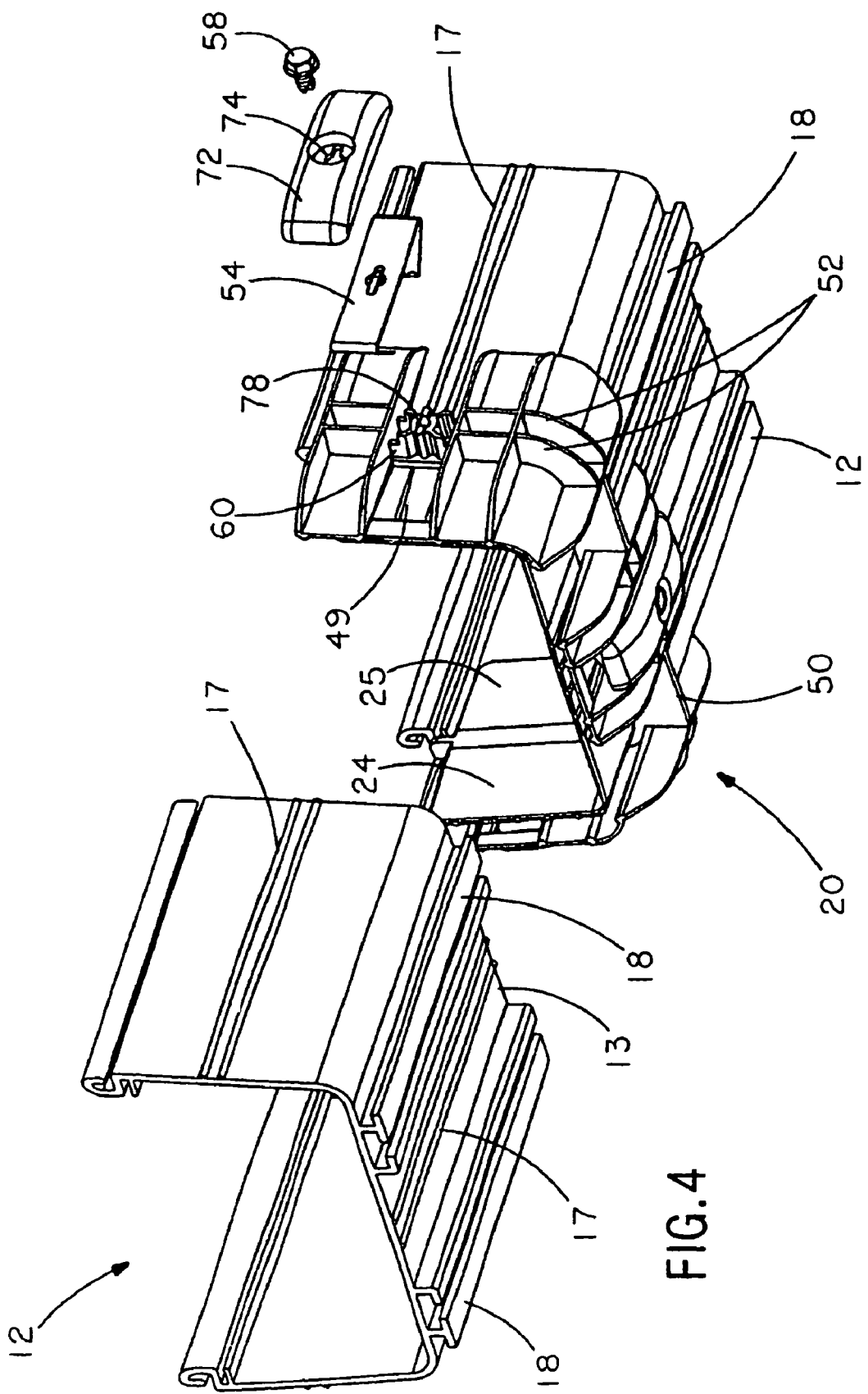
FIG. 4 is a partially exploded perspective view of the duct section coupler of FIG. 1 showing the alignment of an end of the cable duct section with the coupler and the alignment of the barb, cover, and screw to the coupler body.
Figure 5:
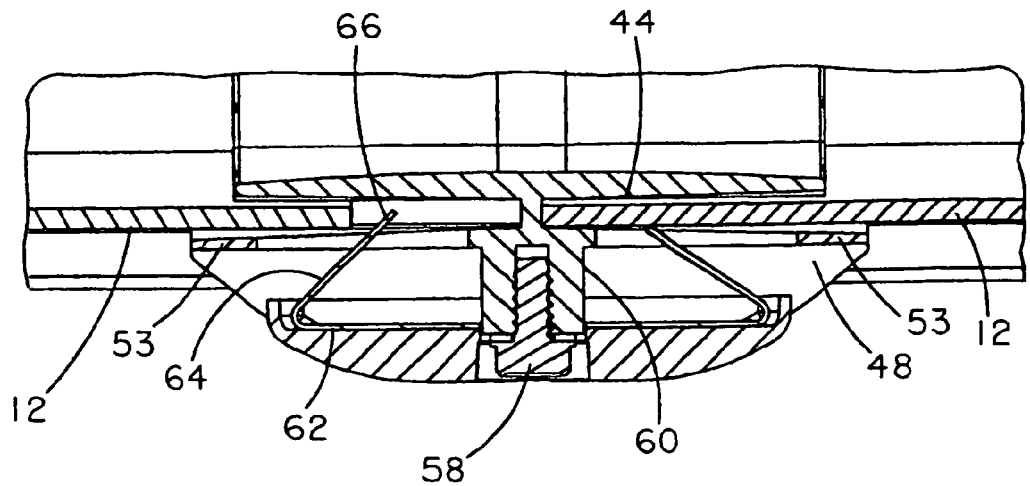
FIG. 5 is a cross-sectional view of the coupler of FIG. 1 showing the barb thereof in detail, the cross-sectional view taken across the line 5-5 in FIG. 1.

In the illustrated embodiment of the invention, and as best seen in FIGS. 2 and 4, between particular outer guide elements, 40 and 42, there are gaps 49. Preferably disposed between transverse web portions 50 and 52 corresponding to adjacent outer guide elements 40 and 42, and preferably disposed on or substantially on the central rib 36, there is a barb mount 60 for receiving a fastener therein. In the illustrated embodiment, the barb mount supports a barb 54 thereon and has an internally threaded aperture 78 therein. As seen in FIGS. 4 and 5, the barb 54 includes a pair of arms 64 bent back relative to a body portion 62 at an angle greater than 90N so that the arms angle towards each other. The barb body 62 is mountable upon the barb mount 60 and retainable thereon by an externally threaded screw 58 or other fastener which penetrates a hole 56 in the barb and is directed into the internally threaded screw aperture 78 in the barb mount 60. Thus, the barbs 54 are mounted in gaps 49 between particular outer guide elements 40 and 42. In a preferred embodiment of the invention, the barb may have serrated edges 66 at the distal ends of its arms 64. The serrated edges permit the barb arms to more reliably engage inserted cable duct sections so as to resist withdrawal of the section from the coupler. In particular, the serrated edge may "bite" or "dig" into the material of the duct section 12, such as extruded plastic.

Figure 6:
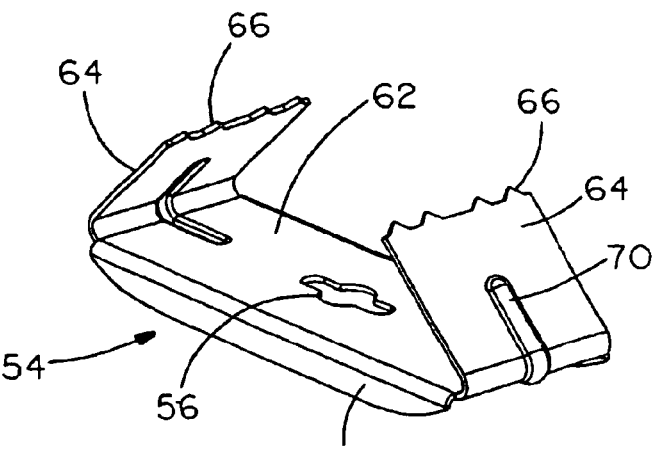
FIG. 6 is a perspective view of an alternative embodiment of the barb.
Figure 7:
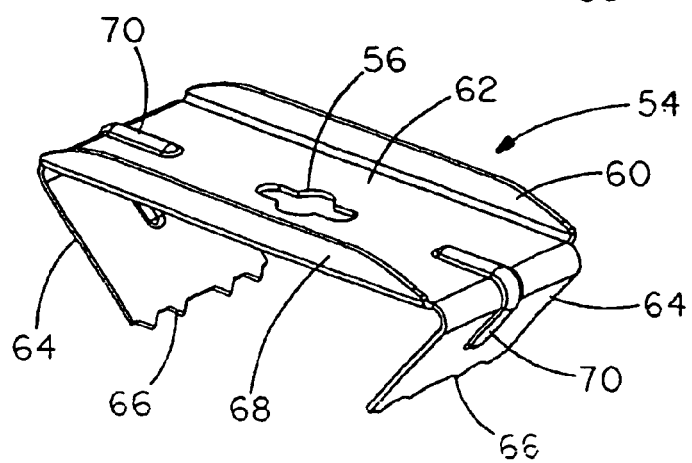
FIG. 7 is a reverse perspective view of the barb of FIG. 6.

Also in a preferred embodiment of the invention, and as best seen in FIGS. 6 and 7, the barb body 62 may have one or more flanges 68 running lengthwise along the edges thereof. Such flanges render the barb body 62 less prone to bending/deflection during withdrawal of a duct section from the coupler and thereby increase the minimum withdrawal force of the coupler. Also in a preferred embodiment of the invention, portions of the barb arms 64 and portions of the barb body 62 include one or more ribs 70 to strengthen the barb and make it less vulnerable to having the barb arm 64 deflected relative to the barb body 62, especially during duct section withdrawal. Also in a preferred embodiment of the invention, the barb cover 72 may include a hole centrally located therein so that it may be retained over the barb body by the screw 58. Covers 72 enhances the aesthetic appearance of the coupler by hiding the metal barbs 54 and, in some embodiments, may provide contact support for the barbs 54 when withdrawal force is applied to a cable duct section inserted into the coupler.

When the end 13 of a cable duct section 12 is to be inserted into a coupler 20 in the illustrated embodiment of the invention, the U-shaped profile of the end 13 is inserted to generally circumscribe the outer surface 27 of the channel portion 22 of the coupler. The various guide surfaces 44 of the outer guide elements 40 and 42 may initially contact the end 13 of the cable duct section 12 and facilitate alignment of the cable duct section into the coupler. In particular, contact ridges 46 of the guide surfaces 44 assist in the alignment upon insertion, as do the contact ridges 28 on the outer surface 27 of the channel portion 22. The cable duct section's strengthening ribs 18 are aligned to fit into gaps between the outer guide elements 40, 42.

While the end 13 of the cable duct section 12 approaches its fully inserted position adjacent to the central rib 36, it encounters barb arms 64 angled generally in the direction of the insertion. Because the end 13 lacks sufficient clearance, it will contact one of each barb's arms 64 upon insertion. The barb arms 64 will deflect slightly toward their respective barb bodies 62 to permit the end 13 to pass thereunder without offering substantial resistance as the end continues toward the central rib 36. The serrated edges 66 of the barb arms 64 will not significantly bite into the extruded plastic end 13 during insertion due to the angle of the barb arms 64. Once the end 13 comes flush with the central rib 36, the insertion is completed.

When a withdrawal force is applied to the cable duct section 12, the end 13 of the cable duct section begins to and nominally slides away from the central rib 36, but upon such nominal movement in the withdrawal direction, the serrated edges 66 of the barb arms 64 bitingly engage and dig in to the extruded plastic of the duct section 12. Longitudinal ribs 17 on the exterior of the duct section are optionally provided to enhance the magnitude of engagement of the barb arms 64 therewith. The withdrawal forces are thereby countered by the resistance of the barb arms 64 to open. Thus, in order to withdraw the cable duct section, enough withdrawal force must be applied to either significantly deform the arms of the barbs or to permit the serrated edges 66 of the barb arms 64 to lose their biting grip thereon and thereby score the cable duct section 12 as it is withdrawn from the coupler. In a preferred embodiment of the invention, the duct section slides under the barb arm, with possible scoring, and the barb arms are not permanently deformed when a withdrawal force exceeding the minimum withdrawal force is applied to the duct section. Avoiding damage to the barb arms permits the coupler to be reused.

In the embodiments of the invention including a barb cover, such as barb cover 72, the cover may prevent or limit deflection of the barb body in a direction away from the cable duct section so as to support the magnitude of biting engagement between the serrated edge 66 and the extruded duct section. In the embodiments shown in FIGS. 6 and 7, the flange(s) 68 and the rib(s) 70 provide the support without the presence of a barb cover.

Figure 8:
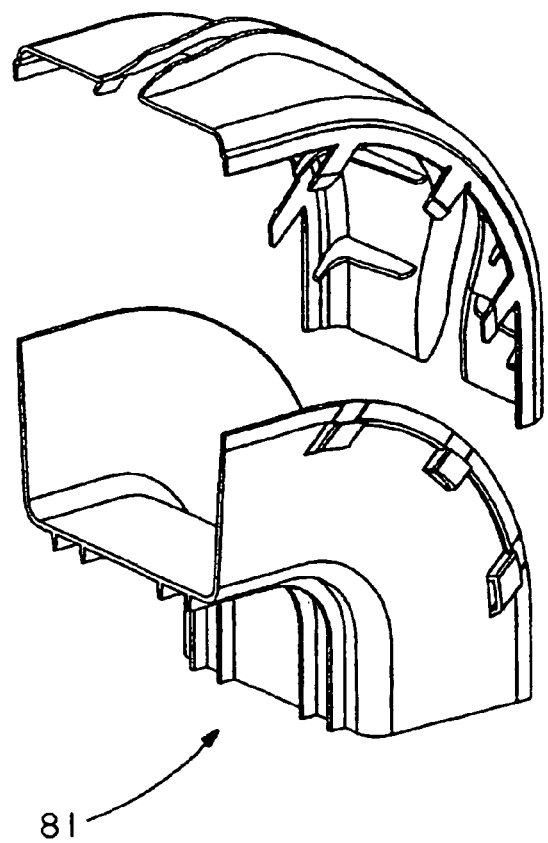
FIGS. 8-15 show various cable duct system fittings, with lids, that may be coupled to each other or to a cable duct section by a coupler in accordance with the invention.
Figure 9:
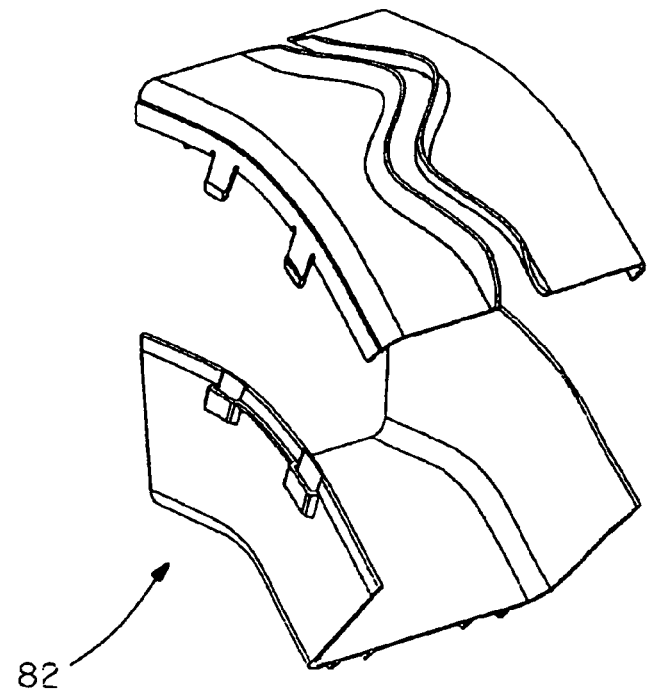
Figure 10:
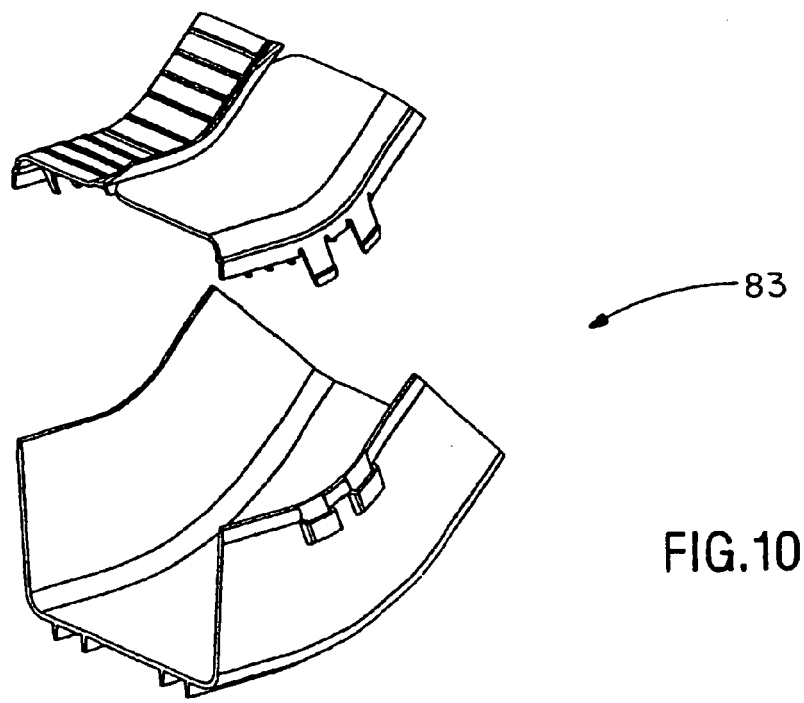
Figure 11:
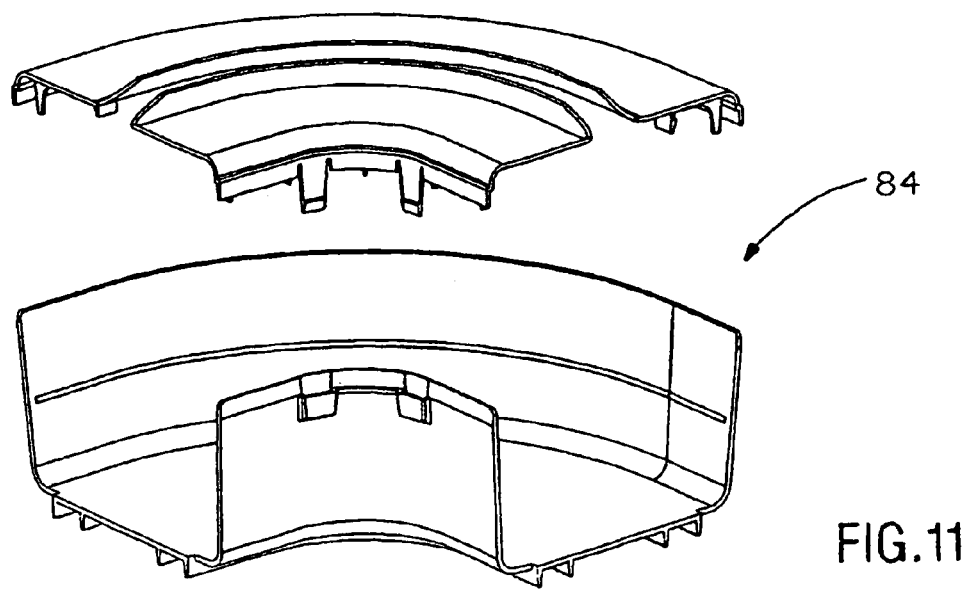
Figure 12:
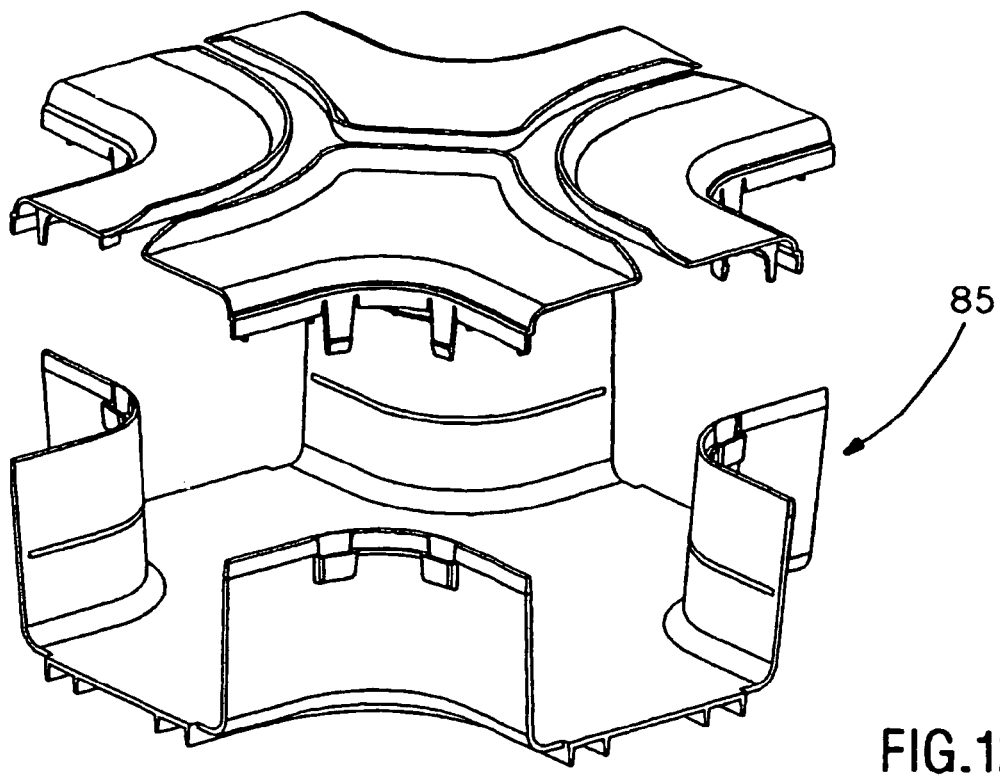
Figure 13:
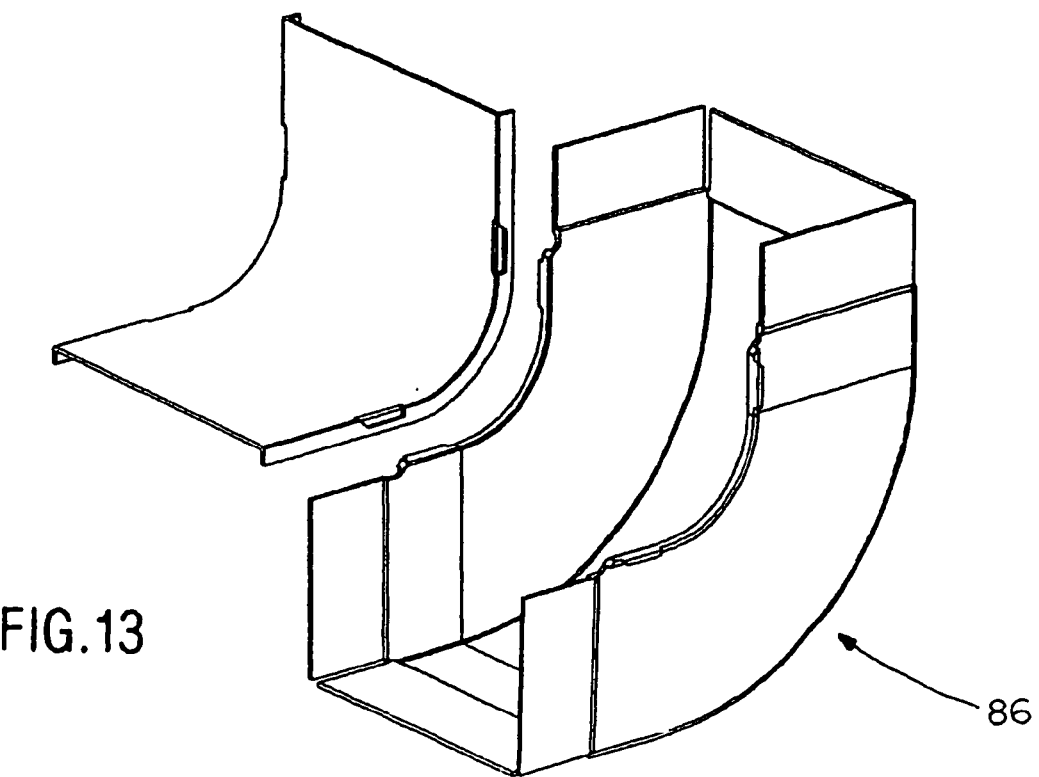
Figure 14:
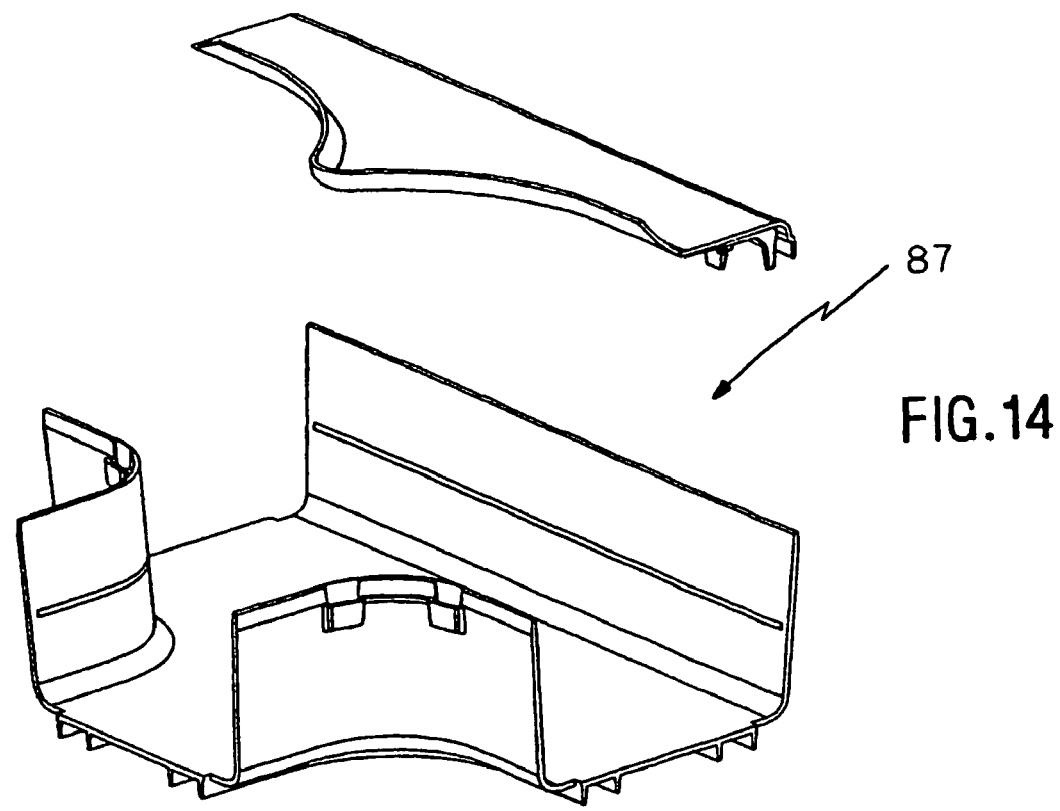
Figure 15:
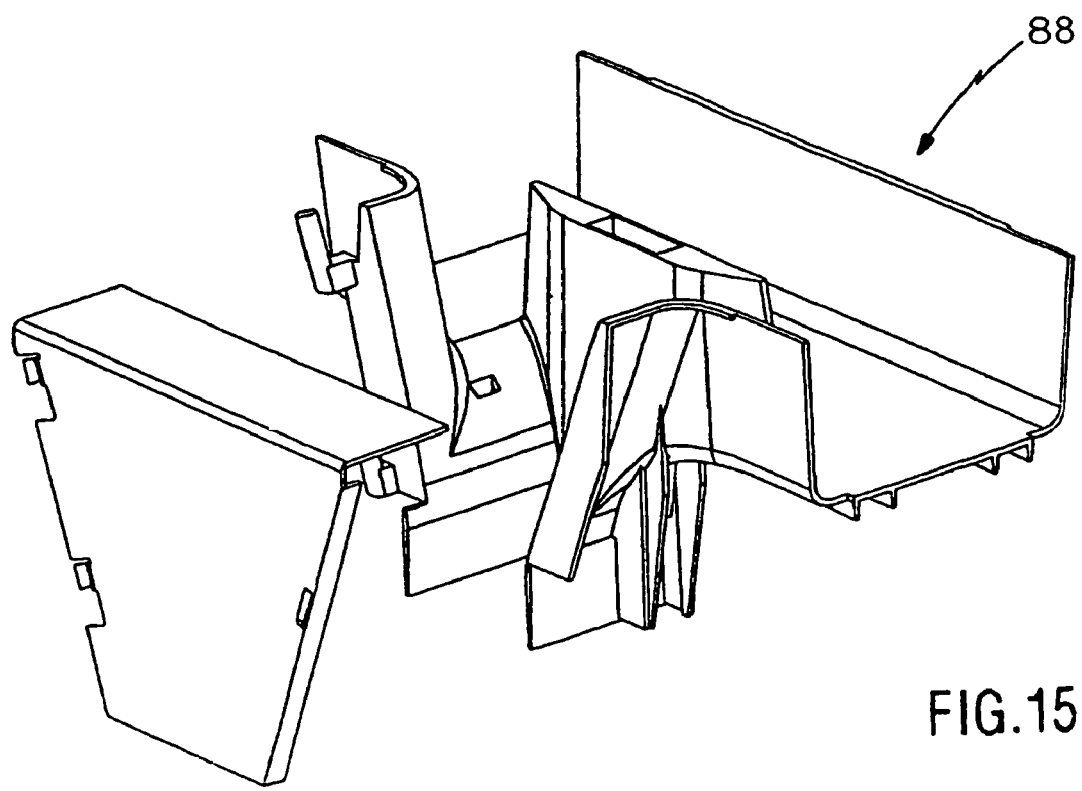

FIGS. 8-15 show various cable duct system fittings, with lids, that may be coupled to each other or to a straight cable duct section by a coupler in accordance with the invention. FIG. 8 shows an outside vertical right angle fitting for routing cable between a horizontal orientation and a vertical orientation. FIG. 9, similarly, shows an outside vertical 45N fitting. FIG. 10 shows an inside vertical 45N fitting. FIG. 11 shows an inside vertical right angle fitting. FIG. 12 shows a four-way cross fitting. FIG. 13 shows an inside vertical right angle fitting. FIG. 14 shows a horizontal Tee fitting. FIG. 15 shows a vertical Tee fitting. These fittings are exemplary and in no way limit the scope of the application of the inventive cable duct system and coupler.

Thus, a duct system is provided that can be easily assembled and prevented from inadvertent disassembly with a simple, reliable structure. Preferably, the duct coupler is pre-installed with the barbs 54 mounted in place on the barb mounts 60. This makes installation easier as all that is required is placement of the duct sections within the duct receiving space 22 of the duct coupler 20. Alternatively, the barbs 54 can be pre-installed in a partial mounting position where they are securely affixed to the barb mounts 60, but spaced in a retracted position such that the arms 64 are not within the duct receiving space 22. Then, upon full insertion of the duct sections into the space 22, the barbs 54 can be fully tightened so that the arms 64 bias the duct section against the inner wall of the duct coupler 20. In this way, ends of the barb arms serve as one embodiment of a locking mechanism.

The duct coupler 20 is still capable of easy removal when desired, for example, through a release mechanism. In one embodiment, the release mechanism comprises screw 58, which can be removed, such as by unthreading. By doing this, the barb 54 is removable from the duct receiving space 22 so that the cable ducts are freely removable from the coupler 20. In this regard, it may not be necessary for the barb 20 to be completely removed from duct coupler 20, but only sufficiently removed such that arms 64 are no longer within the duct receiving space 22.

The disclosed invention provides an improved cable duct coupler and cable duct system. It should be noted that the above-described and illustrated embodiments and preferred embodiments of the invention are not an exhaustive listing of the forms such a coupler and system in accordance with the invention might take; rather, they serve as exemplary and illustrative of embodiments of the invention as presently understood. By way of example, and without limitation, a non-U-shaped coupler and correspondingly shaped duct sections are contemplated to be within the scope of the invention. Similarly, while the illustrated embodiment includes covers over each of the barbs in the coupler, embodiments having no covers are also contemplated by the invention. Many other forms of the invention are believed to exist. The invention is defined by the following claims.

What is claimed is:

1. A cable duct coupler for coupling a first cable duct section to a second cable duct section, said first and second cable duct sections each comprising an end, said cable duct coupler comprising:

an inner wall comprising opposing side walls;

an outer wall spaced apart from said inner wall to define at least one open space for receiving said ends of said first and second cable duct sections; and a releasable locking mechanism, said releasable locking mechanism capable of securing said first cable duct section within said open space of said coupler without the need for tools and resisting a withdrawal force applied to said first cable duct section when said first cable duct section is positioned within said open space.

2. A cable duct coupler in accordance with claim 1, wherein said releasable locking mechanism extends from a first distal end to a second distal end, at least one of said first and second distal ends comprising an edge positioned to engage a portion of at least said first cable duct section when said first cable duct section is positioned within said open space.

3. A cable duct coupler in accordance with claim 2, wherein said first and second distal ends each comprise an edge positioned to engage a portion of said first and second cable duct sections when said first and second cable duct sections are positioned within said open space.

4. A cable duct coupler in accordance with claim 2, further comprising a release mechanism for releasing said releasable locking mechanism after said edge of said releasable locking mechanism engages said first cable duct section.

5. A cable duct coupler in accordance with claim 1, wherein said releasable locking mechanism comprises at least one arm terminating in a free end comprising an edge, said at least one arm comprising a width dimension and said edge comprising a length dimension, wherein said width and length dimensions are equal.

6. A cable duct coupler in accordance with claim 1, wherein said releasable locking mechanism is capable of releasing said first cable duct section after said releasable locking mechanism engages said first cable duct section and secures said first cable duct section within said open space.

7. A cable duct coupler in accordance with claim 1, wherein said releasable locking mechanism comprises a base portion and at least one arm positioned in an angular relationship relative to said base portion.

8. A cable duct coupler in accordance with claim 1 wherein said releasable locking mechanism may be alternatively disposed in an engaged position wherein said locking mechanism engages said first cable duct section to resist withdrawal of said first cable duct section from said open space and a disengaged position wherein said first cable duct section may be freely withdrawn from said open space.

9. A cable duct coupler in accordance with claim 1 wherein said cable duct coupler comprises a U-shape.

10. A cable duct coupler for coupling a first cable duct section to a second cable duct section, said first and second cable duct sections each having an end, said cable duct coupler comprising:

an inner wall comprising opposing side walls;

an outer wall spaced apart from said inner wall to define at least one open space for receiving said ends of said first and second cable duct sections; and a releasable locking mechanism extending from a first distal end to a second distal end, at least one of said first and second distal ends comprising an edge positioned to engage a portion of at least said first cable duct section without the need for tools when said first cable duct section is inserted into said open space, said releasable locking mechanism for engaging said first cable duct section and resisting withdrawal of said first cable duct section from said open space.

11. A cable duct coupler in accordance with claim 10 further comprising a release mechanism associated with said locking mechanism, said release mechanism capable of releasing said releasable locking mechanism after said edge of said releasable locking mechanism engages said first cable duct section.

12. A cable duct coupler in accordance with claim 10 wherein said first and second distal ends each comprise an edge positioned to engage a portion of said first and second cable duct sections when said first and second cable duct sections are inserted into said open space.

13. A cable duct coupler in accordance with claim 10 wherein said releasable locking mechanism is capable of retaining both said first cable duct section and said second cable duct section in said open space.

14. A cable duct coupler in accordance with claim 10 wherein said releasable locking mechanism includes a barb comprising a plurality of arms, at least one of said arms extending into said open space.

15. A cable duct coupler in accordance with claim 14 wherein said barb may be alternatively disposed in a closed position wherein said barb arms bitingly engage said first and second cable duct sections to resist withdrawal of said first and second cable duct sections from said open space, respectively, and an open position wherein said first and second cable duct sections may be freely withdrawn from said open space.

16. A cable duct coupler in accordance with claim 10 wherein said barb is constructed of metal.

17. A cable duct coupler for coupling a first cable duct section to a second cable duct section, said first and second cable duct sections each comprising an end, said cable duct coupler comprising:

an inner wall comprising opposing side walls;

an outer wall spaced apart from said inner wall to define at least one open space for receiving said ends of said first and second cable duct sections;

a locking mechanism for securing said first cable duct section within said open space of said coupler without the need for tools; and a release mechanism for releasing said first cable duct section from said open space.

18. A cable duct coupler in accordance with claim 17 wherein said locking mechanism includes a barb comprising at least one arm extending into said open space for resisting withdrawal of said first cable duct section from said open space.

19. A cable duct coupler in accordance with claim 18 wherein said at least one arm of said barb is contacted by said first cable duct section upon insertion thereof into said open space and thereby deflected and wherein application of a withdrawal force on said first cable duct section causes said barb to bitingly engage said inserted end of said first cable duct section to resist said withdrawal force.

20. A cable duct coupler in accordance with claim 18 wherein said barb may be alternatively disposed in a closed position wherein said barb bitingly engages said first cable duct section to resist withdrawal of said first cable duct section from said open space and an open position wherein said first cable duct section may be freely withdrawn from said open space.

21. A cable duct coupler in accordance with claim 17 further including a barb mount onto which said barb may be mounted and retained.

22. A cable duct coupler in accordance with claim 17 wherein said cable duct coupler comprises a U-shape.

23. A cable duct coupler in accordance with claim 17 wherein said open space comprises a first duct receiving portion and a second duct receiving portion separated by a rib.

24. A cable duct coupler in accordance with 1, wherein said locking mechanism comprises at least one arm and said at least one arm is angled in the direction of insertion of said first cable duct section.

25. A cable duct coupler in accordance with claim 24, wherein an end of said at least arm is positioned to engage a portion of said first cable duct section after insertion.

26. A cable duct coupler in accordance with claim 24, wherein a withdrawal force applied to said first cable duct section after insertion is countered by resistance of said at least one arm to open in a direction opposite insertion of said first cable duct section.

27. A cable duct coupler in accordance with claim 1, wherein said release mechanism is capable of releasing said locking mechanism from said first cable duct section after said locking mechanism secures said first cable duct section within said open space.

28. A cable duct coupler in accordance with 10, wherein said locking mechanism comprises at least one arm and said at least one arm is angled in the direction of insertion of said first cable duct section.

29. A cable duct coupler in accordance with claim 28, wherein an end of said at least arm is positioned to engage a portion of said first cable duct section after insertion.

30. A cable duct coupler in accordance with claim 28, wherein a withdrawal force applied to said first cable duct section after insertion is countered by resistance of said at least one arm to open in a direction opposite insertion of said first cable duct section.

31. A cable duct coupler in accordance with claim 10, wherein said release mechanism is positioned on said coupler in contact with said locking mechanism.

32. A cable duct coupler in accordance with claim 10, wherein the opposing walls of the inner side walls form an obtuse angle.

33. A cable duct coupler in accordance with 17, wherein said locking mechanism comprises at least one arm and said at least one arm is angled in the direction of insertion of said first cable duct section.

34. A cable duct coupler in accordance with claim 33, wherein an end of said at least arm is positioned to engage a portion of said first cable duct section after insertion.

35. A cable duct coupler in accordance with claim 33, wherein a withdrawal force applied to said first cable duct section after insertion is countered by resistance of said at least one arm to open in a direction opposite insertion of said first cable duct section.

36. A cable duct coupler in accordance with claim 17, wherein said release mechanism is positioned on said coupler in contact with said locking mechanism.

* * * * *

UNITED STATES PATENT AND TRADEMARK OFFICE
CERTIFICATE OF CORRECTION

PATENT NO. : 8,083,187 B2
APPLICATION NO. : 11/222688
DATED : December 27, 2011
INVENTOR(S) : William A. Bernard et al.

Page 1 of 1

It is certified that error appears in the above-identified patent and that said Letters Patent is hereby corrected as shown below:

Column 9, line 1, which reads "A cable duct coupler in accordance with 1, wherein said" should read "A cable duct coupler in accordance with claim 1, wherein said"

Column 9, line 6, which reads "wherein an end of said at least arm is positioned to engage a" should read "wherein an end of said at least one arm is positioned to engage a"

Column 9, line 18, which reads "A cable duct coupler in accordance with 10, wherein" should read "A cable duct coupler in accordance with claim 10, wherein"

Column 9, line 23, which reads "wherein an end of said at least arm is positioned to engage a" should read "wherein an end of said at least one arm is positioned to engage a"

Column 10, line 10, which reads "A cable duct coupler in accordance with 17, wherein" should read "A cable duct coupler in accordance with claim 17, wherein"

Column 10, line 15, which reads "wherein an end of said at least arm is positioned to engage a" should read "wherein an end of said at least one arm is positioned to engage a"

Signed and Sealed this
Twelfth Day of March, 2013

Teresa Stanek Rea
*Acting Director of the United States Patent and Trademark Office*